US012586035B2

(12) United States Patent
Mochty et al.

(10) Patent No.:  US 12,586,035 B2
(45) **Date of Patent:  *Mar. 24, 2026**

(54) INTERACTIVE USER INTERFACE FOR SYSTEM

(71) Applicant: EY GmbH & Co. KG Wirtschaftsprüfungsgesellschaft, Stuttgart (DE)

(72) Inventors: Ludwig Mochty, Essen (DE); Michael Wiese, Essen (DE)

(73) Assignee: EY GmbH & Co. KG Wirtschaftsprufungsgesellschaft, Stuttgart (DE)

( * ) Notice: Subject to any disclaimer, the term of this patent is extended or adjusted under 35 U.S.C. 154(b) by 127 days.

This patent is subject to a terminal disclaimer.

(21) Appl. No.: 17/427,203

(22) PCT Filed: Jan. 31, 2020

(86) PCT No.: PCT/IB2020/050787
§ 371 (c)(1),
(2) Date: Jul. 30, 2021

(87) PCT Pub. No.: WO2020/157718
PCT Pub. Date: Aug. 6, 2020

(65) Prior Publication Data
US 2025/0021935 A1     Jan. 16, 2025

(30) Foreign Application Priority Data

Jan. 31, 2019   (GB) ...................................... 1901351

(51) Int. Cl.
   *G06Q 10/10*        (2023.01)
   *G06Q 10/04*        (2023.01)
(52) U.S. Cl.
   CPC ............. *G06Q 10/10* (2013.01); *G06Q 10/04* (2013.01)

(58) Field of Classification Search
   CPC ............................... G06Q 10/10; G06Q 10/04
   See application file for complete search history.

(56) References Cited

U.S. PATENT DOCUMENTS 7,953,688 B2     5/2011  Sadeh
10,496,927 B2*  12/2019  Achin ................... G06Q 10/06
(Continued)

OTHER PUBLICATIONS

International Search Report and Written Opinion of the International Searching Authority mailed in International Patent Application PCT/IB2020/050787 on Apr. 17, 2020, 10 pages.

*Primary Examiner* — Jessica Lemieux
*Assistant Examiner* — Nico L Padua
(74) *Attorney, Agent, or Firm* — Kevin J Fournier Intellectual Property Legal Services Ltd; Kevin J Fournier

(57)            ABSTRACT

There is provided an interactive user interface (1100) for time series planning, evaluation and prediction system to be employed for obtaining audit evidence, wherein audit evidence is to be obtained based upon input data pertaining to given use case, input data being in time structured form, interactive user interface comprising: (i) input interface element that enables user to input plurality of audit parameters; and (ii) output interface element that enables time series planning, evaluation and prediction system to present to user: (a) time series chart representing variation in response variable with respect to time, wherein time series chart indicates upper acceptance bound and lower acceptance bound and is generated for plurality of samples associated based upon input data, plurality of audit parameters and at least one explanatory variable; and (b) key items, wherein key items are identified as samples that fall outside upper acceptance bound and lower acceptance bound in time series chart.

11 Claims, 7 Drawing Sheets

(56) References Cited

U.S. PATENT DOCUMENTS

| 11,580,419 B2 * | 2/2023 | Rosler | G06N 5/04 |
|---|---|---|---|
| 2007/0067269 A1 * | 3/2007 | Rudge | G06F 9/451 |
| 2011/0258088 A1 * | 10/2011 | Padala | G06Q 40/02 |
| | | | 705/30 |
| 2018/0219889 A1 * | 8/2018 | Oliner | G06N 3/04 |
| 2019/0355066 A1 * | 11/2019 | Wainman | G06F 16/9024 |

* cited by examiner

INTERACTIVE USER INTERFACE FOR SYSTEM

TECHNICAL FIELD

The present disclosure relates generally to interactive user interfaces; more specifically, the present disclosure relates to interactive user interfaces for use in combination with systems that, when in operation, provide time series planning, evaluation and prediction. Moreover, the present disclosure relates to methods for (namely, to methods of) using aforesaid interactive user interfaces. Furthermore, the present disclosure also relates to software products comprising non-transitory machine-readable data storage mediums having stored thereon program instructions, the program instructions being accessible by processing devices to execute the aforementioned methods.

BACKGROUND

Devices and systems that provided a user interface and perform computations are known. For example, in a published European patent application EP1505512A2 (applicant Hewlett Packard; "Input and evaluation of fractions using a calculator"), there is described use of a user interface to a calculating device, for which a search was generated as published in EP1505512A3. Clearly, in this example application, submitted after the Strasbourg Convention 1963 came into force as enshrined in Art. 52(2) EPC, there was assessed to be a technical effect.

Commercial enterprises such as manufacturing units, retailers, banks, money-lenders, currency exchangers, generally perform several financial and non-financial operations over time, and therefore, are required to maintain detailed records pertaining thereto. However, such records need to be verified for accuracy, precision and reliability, by a procedure known as an "audit". Typically, audits involve a detailed analysis and an inspection of records of a given enterprise's financial and non-financial operations over a given time period. Furthermore, such audits need to be done regularly in order to maintain reliable financial records, to prevent frauds and to improve credibility of the given enterprise.

Generally, the audit is performed by a person (commonly known as an "auditor") having knowledge of accounting, business administration, auditing, and the like. For efficiently performing the audit, the auditor generally performs audit planning before starting the audit. The audit planning includes two steps, one of assessing risk of material misstatement, and one of responding to those risks by obtaining audit evidence. Notably, such audit planning helps in development of appropriate audit strategies which need to be subsequently executed by the auditor. Therefore, the audit planning operation forms a crucial part of the audit.

Presently, several analytical methods are used by the auditor for obtaining audit evidence. Since, such analytical methods are computationally intensive, and including (i) organising of records that need to be analysed, (ii) representing the records that need to be analysed, and (iii) providing user-friendly representations of results that are obtained upon implementing analytical methods on the records.

When auditing, it is extremely important to ensure accuracy and time-efficiency of such analytical methods. Existing resources that are employed by the auditors for implementing such analytical methods lack means for properly organizing and representing the records that need to be analysed. As a result, it is often difficult for the auditor to view such records and derive inferences therefrom. Moreover, existing resources lack provisions for presenting results that are obtained upon processing such records, in a user-friendly manner. Furthermore, there currently exist very limited opportunities to customize the results as per the auditor's preference.

In a published United States patent application US2015/0222929A1 (Applicant—PriceWaterhouseCoopers; "Systems and methods for investigation of financial reporting information"), there is described a method of analyzing financial information, wherein the method comprises:

(i) receiving a plurality of financial data aggregations;

(ii) receiving a plurality of transactions amongst the plurality of financial data aggregations;

(iii) generating a money flow representation of a flow of money amongst the plurality of financial data aggregations, according to the plurality of transactions; and (iv) analyzing the money flow representation using a structural equivalence profiling.

Therefore, in light of the foregoing discussion, there exists a need to overcome the aforementioned drawbacks associated with managing and representing records that need to be analysed via audit planning procedures.

SUMMARY

The present disclosure seeks to provide an improved interactive user interface for a time series planning, evaluation and prediction system.

The present disclosure seeks to provide a solution to the existing problems associated with representation of records and processed information pertaining to analytical techniques for obtaining audit evidence. An aim of the present disclosure is to provide a solution that overcomes at least partially the problems encountered in prior art, and provides a user-friendly, time-efficient and customisable user interface that enables proper visual representation of records that need to be analysed for obtaining audit evidence.

In a first aspect, the present disclosure provides an interactive user interface for a time series planning, evaluation and prediction system, wherein the time series planning, evaluation and prediction system is to be employed for obtaining audit evidence, and wherein the audit evidence is to be obtained based upon input data pertaining to a given use case, the input data being in a time structured form, the interactive user interface comprising:

(i) at least one input interface element that enables the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation; and (ii) at least one output interface element that enables the time series planning, evaluation and prediction system to present to the user:

(a) a time series chart representing a variation in a response variable with respect to time, wherein the time series chart indicates an upper acceptance bound and a lower acceptance bound of data points in the time series chart, and wherein the time series chart is generated for a plurality of samples associated with the given use case based upon the input data, the plurality of audit parameters and at least one explanatory variable; and (b) key items, wherein the key items are identified as samples that fall outside the upper acceptance bound and the lower acceptance bound in the time series chart.

The invention is of advantage in that the time series chart together with its upper and lower acceptance bound of data points are effective to identify samples that fall outside the upper acceptance bound and the lower acceptance bound in the time series chart. Embodiments of the present disclosure substantially eliminate or at least partially address the afore-mentioned problems in the prior art, and enables user-friendly representation of information, whilst obtaining audit evidence.

In a second aspect, there is provided a method for (namely, a method of) generating an interactive user inter-face for a time series planning, evaluation and prediction system, wherein the time series planning, evaluation and prediction system is to be employed for obtaining audit evidence, and wherein the audit evidence is to be obtained based upon input data pertaining to a given use case, the input data being in a time structured form, the method comprising:

(i) using at least one input interface element that enables the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation; and (ii) using at least one output interface element that enables the time series planning, evaluation and prediction system to present to the user:

(a) a time series chart representing a variation in a response variable with respect to time, wherein the time series chart indicates an upper acceptance bound and a lower acceptance bound of data points in the time series chart, and wherein the time series chart is generated for a plurality of samples associ-ated with the given use case based upon the input data, the plurality of audit parameters and at least one explanatory variable; and (b) key items, wherein the key items are identified as samples that fall outside the upper acceptance bound and the lower acceptance bound in the time series chart.

According to a third aspect, there is provided a software product comprising non-transitory machine-readable data storage mediums having stored thereon program instruc-tions, the program instructions being accessible by process-ing devices to execute the method of the second aspect.

Additional aspects, advantages, features and objects of the present disclosure would be made apparent from the draw-ings and the detailed description of the illustrative embodi-ments construed in conjunction with the appended claims that follow.

It will be appreciated that features of the present disclo-sure are susceptible to being combined in various combina-tions without departing from the scope of the present dis-closure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
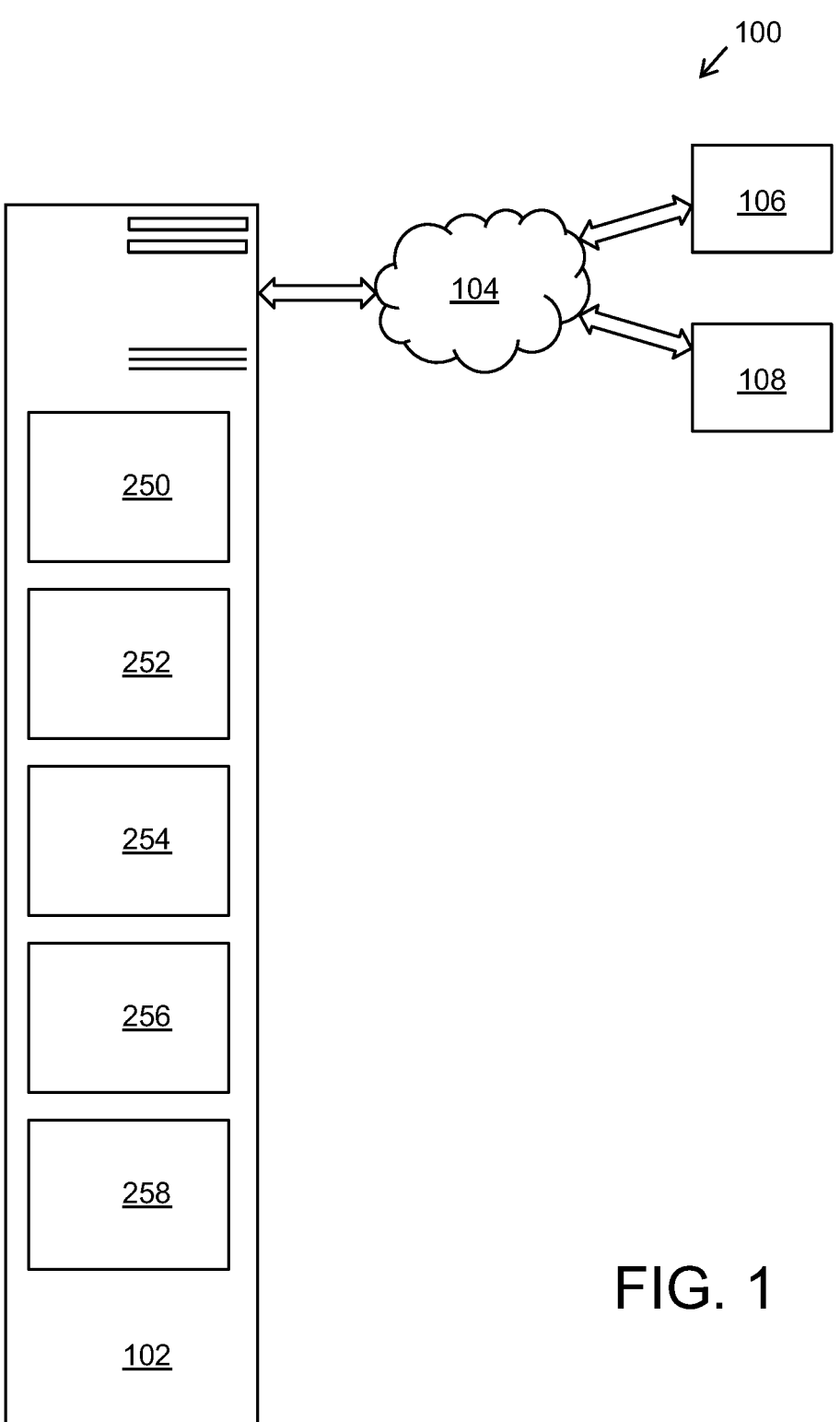
FIG. 1 is an illustration of a system that, when in operation, provides time series planning, evaluation and prediction.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accom-panied by an associated arrow, the non-underlined number is used to identify a general item at which the arrow is pointing.

DETAILED DESCRIPTION OF EMBODIMENTS

The following detailed description illustrates embodi-ments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides an interactive user interface for a time series planning, evaluation and prediction system, wherein the time series planning, evalu-ation and prediction system is to be employed for obtaining audit evidence, and wherein the audit evidence is to be obtained based upon input data pertaining to a given use case, the input data being in a time structured form, the interactive user interface comprising:

(i) at least one input interface element that enables the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation; and (ii) at least one output interface element that enables the time series planning, evaluation and prediction system to present to the user:

(a) a time series chart representing a variation in a response variable with respect to time, wherein the time series chart indicates an upper acceptance bound and a lower acceptance bound of data points in the time series chart, and wherein the time series chart is generated for a plurality of samples associ-ated with the given use case based upon the input data the plurality of audit parameters and at least one explanatory variable; and (b) key items, wherein the key items are identified as samples that fall outside the upper acceptance bound and the lower acceptance bound in the time series chart.

The present disclosure provides the aforementioned user interface for the time series planning, evaluation and prediction system. The user interface allows for obtaining inputs from the user and providing user-friendly and customisable representations of information to the user. As a result, the user interface facilitates the user in better organization, viewing, analysis, and processing of information whilst obtaining audit evidence.

It will be appreciated that the aforesaid time series planning, evaluation and prediction system is not limited to obtaining the audit evidence for only a single use case and can be employed to obtain audit evidences for a plurality of use cases (namely, multiple use cases). In such a case, separate interactive user interfaces are implemented for each use case of the plurality of use cases.

Optionally, the time series planning, evaluation and prediction system comprises a server arrangement that is configured to implement a method of obtaining audit evidence. Throughout the present disclosure, the term "server arrangement" relates to an arrangement of at least one server that, when operated, performs the method of obtaining the audit evidence.

In an example embodiment, the time series planning, evaluation and prediction system is automated (namely, fully autonomous). In another example embodiment, the time series planning, evaluation and prediction system is semi-automated (namely, semi-autonomous).

Throughout the present disclosure, the term "audit evidence" relates to all information (such as the records of the given establishment's financial and non-financial operations, information pertaining to the given establishment from other sources, and the like) that is utilised by an auditor to form an audit conclusion.

For illustration purposes only, there will now be considered an exemplary network environment, wherein the time series planning, evaluation and prediction system is implemented pursuant to embodiments of the present disclosure. The exemplary network environment includes a source of the input data pertaining to the given use case, a user device associated with the user of the time series planning, evaluation and prediction system, the server arrangement including the at least one server, and a communication network. Notably, the server arrangement is coupled in communication with the source of the input data either directly, or via the communication network. Furthermore, in the exemplary network environment, the server arrangement is coupled in communication with the user device via the communication network. In such a case, the user device can be understood to be the "client" for the server arrangement. It is to be noted here that the server arrangement can be optionally coupled in communication with a plurality of user devices associated with a plurality of users. Examples of the user device include, but are not limited to, a mobile phone, a smart telephone, a Mobile Internet Device (MID), an Ultra-Mobile Personal Computer (UMPC), a phablet computer, a Personal Digital Assistant (PDA), a web pad, a Personal Computer (PC), a handheld PC, a laptop computer, a tablet computer, and a desktop computer.

In an embodiment, the source of the input data is at least one entity device associated with an entity, the entity being associated with the given use case for which the audit evidence is to be obtained. Optionally, the entity is an organisation (namely, a firm or a company) being audited.

Examples of the at least one entity device include, but are not limited to, a mobile phone, a smart telephone, a Mobile Internet Device (MID), an Ultra-Mobile Personal Computer (UMPC), a phablet computer, a Personal Digital Assistant (PDA), a web pad, a Personal Computer (PC), a handheld PC, a laptop computer, a tablet computer, and a desktop computer. In another embodiment, the source of the input data is a database arrangement comprising at least one database, the database arrangement being configured to store thereupon, the input data pertaining to the given use case for which the audit evidence is to be obtained.

Throughout the present disclosure, the term "input data" relates to disaggregated data pertaining to the given use case, such disaggregated data including the time-structured data values of the set of variables for:

(i) a portion of an entire population of financial and non-financial records associated with the given use case, or (ii) the entire population of financial and non-financial records associated with the given use case.

As an example, if the entire population of financial and non-financial records associated with the given use case includes 1000 records (namely, 1000 samples), the input data includes the time-structured data values of the set of variables for:

(i) a portion of the entire 1000 records, for example, such as 350 records (namely, 350 samples), or (ii) the entire 1000 records (namely, 1000 samples).

Furthermore, the set of variables can be understood to be attributes related to the given use case, and the time-structured data values of the set of variables provides financial and/or non-financial records related to the given use case.

As an example, a given use case 'UC' may relate to sales for a given manufacturer. In such an example, the input data relates to disaggregated data that includes data values of a set of eight variables V1-V8 for 36 months (namely, three years) associated with financial and accounting items for the given manufacturer. In other words, the input data comprises the time-structured data values of the set of eight variables V1-V8 for 36 samples associated with the given use case. Furthermore, for example, the variable V1 is rent, the variable V2 is sales, the variable V3 is selling area, the variable V4 is cost of sales, the variable V5 is an inventory, the variable V6 is personnel cost, the variable V7 is a total trade profit, and the variable V8 is a number of customers. Moreover, the data values for a given variable, for example, such as the variable V2 may be £51,000; £94,000; £115,000; £103,000; £73,000; £101,500; £109,000; £84,000; £71,000; £118,000; £77,000; £61,500; £105,000; £95,000; £54,000; £121,500; £82,000; £52,000; £58,000; £98,000; £127,000; £88,000; £100,000; £112,000; £89,500; £100,000; £66,000; £125,000; £75,000; £102,000; £77,000; £107,500; £109,500; £84,000; £70,000; and £96,500. Such data values are arranged in increasing order of time, namely, from January 2014, February 2014, March 2014, and so on, until December 2016. Similar data values (with or without units) may be obtained corresponding to other variables, for the 36 samples.

The input data is in the time structured form. Notably, the input data is arranged (namely, structured) with respect to time. Furthermore, the input data has information about the time to which the input data is related. Moreover, the information about the time is available in form of a sequence of characters for example, such as a time stamp. In an example, the time stamp associated with the input data includes information related to a given time and a given date to which the input data is related.

Optionally, the input data is arranged (namely, structured) according to an increasing and/or decreasing order of time. In an example, the input data can be arranged on daily or weekly basis. In another example, the input data can be arranged on monthly basis. In yet another example, the input data is arranged on quarterly or yearly basis.

As an example, a given use case relates to financial and accounting items for a given company. In such an example, the input data relates to a set of five variables A1-A5 associated with financial and accounting items for the given company. In such an example, the input data can be structured on monthly basis based upon a given time period for which the audit evidence is to be obtained. Furthermore, the given time period is optionally three years for example, such as from January 2014 to December 2016. Moreover, in such an example, the variable A1 includes monthly data related to total revenues of the given company over the given time period, the variable A2 includes monthly data related to total expenses of the given company over the given time period, the variable A3 includes monthly data related to cost of materials for the given company over the given time period, the variable A4 includes monthly data related to personnel expenses of the given company over the given time period and the variable A5 includes monthly data related to trade receivables of the given company over the given time period.

Optionally, the obtained input data is validated based upon a predefined set of statistical rules. Notably, the predefined set of statistical rules are employed to validate the input data according to at least one of: data type, data value, data structure, data consistency, data format, data accuracy, and data relevance. It will be appreciated that such validation of the input data allows for ensuring a planned precision level and a planned reliability level of the input data. Furthermore, the aforesaid validation operation can be performed by the server arrangement and/or the user of the time series planning, evaluation and prediction system. Optionally, the at least one output interface element enables the time series planning, evaluation and prediction system to present validated input data to the user. As an example, by way of the output interface element, the validated input data is presented in form of: a table, a text, or a list.

Optionally, the validated input data is reconciled. In such an example, the user compares the validated input data with the input data stored at the source of the input data, to identify irregularities and inconsistencies therebetween. Beneficially, such a reconciliation operation allows for substantially reducing errors associated with incorrect obtaining and validation of the input data. Optionally, the at least one output interface element presents to the user, a variable summary that facilitates the user to reconcile the validated input data to the source from where the input data was obtained. As an example, by way of the output interface element, the variable summary is presented in form of: a table, a text, or a list.

Throughout the present disclosure, the term "interactive user interface" can also be referred to as a "human-machine interface". The interactive user interface is generally rendered upon a display screen of the user device and allows for the aforesaid time series planning, evaluation and prediction system to receive input(s) from and/or provide output(s) to the user. Notably, the interactive user interface optionally has a customisable aesthetic appearance.

The interactive user interface comprises the at least one input interface element and the at least one output interface element. Throughout the present disclosure, the term "input interface element" relates to an element (such as, an object) rendered upon the interactive user interface, that allows for the user to provide input(s) to the time series planning, evaluation and prediction system. Throughout the present disclosure, the term "output interface element" relates to an element rendered upon the interactive user interface that allows for the time series planning, evaluation and prediction system to provide output to the user.

Optionally, at the interactive user interface:

the at least one input interface element is implemented by way of at least one of: a user-selectable object, an input field, a slider, a drop-down menu; and the at least one output interface element is implemented by way of at least one of: a table, a list, an image, text, a statistical representation. Examples of the user-selectable object include, but are not limited to, a user-selectable icon, a user-selectable button, a drop-down box menu having a plurality of user-selectable options. Furthermore, examples of the aforesaid statistical representation include, but are not limited to, a bar graph, a histogram, a pie chart, a solar representation, a scatter plot, a line chart, and an area chart.

In an example scenario, the user provides the input, via the at least one input interface element, by way of: clicking on (namely, selecting) the user-selectable object, entering a value in the input field, adjusting (namely, moving a cursor of) the slider, and the like.

In an embodiment, at the interactive user interface, the at least one input interface element and the at least one output interface element are rendered in a non-overlapping manner.

In another embodiment, at the interactive user interface, the at least one input interface element and the at least one output interface element are rendered in an overlapping manner. In such a case, the at least one input interface element and the at least one output interface element are rendered by way of a plurality of overlapping layers.

In yet another embodiment, the interactive user interface comprises a plurality of user interface tabs, wherein a given user interface tab includes the at least one input interface element and/or the at least one output interface element. Such a plurality of user interface tabs allows for providing the user with different views of the interactive user interface simultaneously. The user can therefore utilise the plurality of user interface tabs whilst operating the interactive user interface.

Optionally, the interactive user interface enables the user to adjust a relative arrangement of the at least one input interface element and/or the at least one output interface element. Such an adjustment operation allows for the user to arrange the input and/or output interface element(s) according to his/her preference, thereby facilitating the user to view information pertaining to the audit evidence, in a desired manner. As an example, the at least one input interface element and/or the at least one output interface element are arranged over the plurality of user interface tabs, the plurality of overlapping layers, and so forth. In such an example, the plurality of user interface tabs, overlapping layers and so forth, can be accessed by swiping, clicking, selecting and so forth. Furthermore, adjusting the relative arrangement of the at least one input interface element and/or the at least one output interface element over the plurality of overlapping layers, user interface tabs and so forth enhances the ability of the user to view the desired information as per his/her requirement.

In an example, the user arranges the at least one input interface element and the at least one output interface element on a single user interface tab. In another example, the user arranges all the output interface elements implemented by way of statistical representation on a first user interface tab, and all the input interface elements on a second user interface tab. In yet another example, the user arranges a layer of one input interface element to overlap another layer of another input interface element, and so forth. In still another example, the user arranges all the input interface elements implemented by way of input fields, drop-down menus, sliders and so forth, on a single user interface tab. In yet another example, a layer of one input interface element and a layer of one output interface element can overlap each other. In still another example, the at least one user interface tab may overlap another user interface tab. Optionally, the size of the at least one input interface element and/or the at least one output interface element is customisable. In other words, the user adjusts the size of the at least one input interface element and/or the at least one output interface element, as per his/her interest via dragging edges of the at least one input interface element and/or the at least one output interface element, pinching and zooming-in/out of the at least one input interface element and/or the at least one output interface element, and the like. It will be appreciated that the aforesaid customisation of the size of the at least one input interface element and/or the at least one output interface element, allows for adjusting the relative arrangement of the at least one input interface element and/or the at least one output interface element.

Optionally, the interactive user interface enables the user to adjust an appearance of the at least one input interface element and/or the at least one output interface element. Optionally, the appearance of the at least one input interface element and/or the at least one output interface element is adjusted by way of adjusting at least one of: a theme, a colour, a size, a shape and a font of the at least one input interface element and/or the at least one output interface element.

In an example, the user is able to change the colour to adjust the appearance of the at least one input interface element and/or the at least one output interface element. In another example, the user is able to change the theme to adjust the appearance of the at least one input interface element and/or the at least one output interface element. In yet another example, the user is able to change font size and font style to adjust the appearance of the at least one input interface element and/or the at least one output interface element.

As mentioned previously, the at least one input interface element enables the user to input the plurality of audit parameters to be employed for the audit evidence. The plurality of audit parameters comprises at least one of: the assurance level to be achieved, the tolerable error, the statistical sampling technique to be employed, the time period for which audit evidence is to be obtained, the level of data aggregation. The plurality of audit parameters acts as a basis upon which the input data is to be analysed (namely, evaluated) for obtaining the audit evidence. The "assurance level" to be achieved for a given variable relates to a level of confidence that is to be achieved pertaining to accuracy of given data values of the given variable. Therefore, higher the assurance level to be achieved for the given variable, higher the confidence that is to be achieved pertaining to accuracy of given data values of the given variable. In an embodiment, the "tolerable error" relates to an acceptable amount (namely, measure) by which a given data value of a given variable can vary from its actual (namely, real or true) value, without considerably impacting the audit evidence. In other words, the tolerable error relates to a maximum acceptable error that can be associated with the given data value, without the given data value being considered as a misstatement. In an embodiment, the "statistical sampling technique to be employed" relates to a technique that is to be employed for obtaining remaining samples that are to be subsequently analysed for obtaining the audit evidence, from among the entire population of financial and non-financial records associated with the given use case. In one case, the remaining samples include the entire population of such financial and non-financial records. In another case, the remaining samples include only a given portion (namely, only a few records) of the entire population of such financial and non-financial records. Notably, the statistical sampling technique is to be employed upon identification of the key items. Examples of the statistical sampling technique to be employed include, but are not limited to, monetary unit sampling, attribute sampling, stratified sampling, variable sampling. In an embodiment, the "time period for which audit evidence is to be obtained" relates to a period of time between an audit start date and an audit end date, that defines a period for which the audit evidence is to be obtained. In one case, the server arrangement is configured to automatically select the time period for which the audit evidence is to be obtained. In such an example, the automatic selection is optionally a random selection, a default selection, or a selection by way of at least one artificial intelligence algorithm. In another example, the server arrangement is configured to enable the user to select the time period for which the audit evidence is to be obtained by providing an input area for entering the value for audit start time and audit end time, at the interactive user interface. As an example, the time period for which the audit evidence is to be obtained can be of one year (for example, such as one audit period) for example, such as from January 2016 to December 2016. In such an example, the system obtains the audit evidence for one audit period based upon the input data for the past two years (for example, such as an input data for 24 months from January 2014 to December 2015). In an example embodiment, the "level of data aggregation" relates to a given level of data aggregation in which the input data is structured and expressed in a summary form, for purposes such as statistical analysis. For example, the level of data aggregation may be daily basis, weekly basis, monthly basis, quarterly basis, half yearly basis or yearly basis. In an example, the server arrangement is configured to provide a predefined level of data aggregation for example, such as monthly basis.

Optionally, the assurance level to be achieved is expressed as a percentage of assurance. In an embodiment, the assurance level to be achieved ranges from 0 percent assurance to 100 percent assurance.

Optionally, the plurality of audit parameters further comprises a combined risk assessment for the given use case, the combined risk assessment comprising at least two of: an inherent risk associated with the given use case, a control risk associated with the given use case, a detection risk associated with the given use case.

Optionally, the plurality of audit parameters further comprises the response variable and the at least one explanatory variable.

Optionally, the plurality of audit parameters further comprises a number of errors planned for, whilst obtaining the audit evidence.

In an exemplary embodiment, there are four audit parameters to be provided by the user. Additionally, the four audit parameters to be provided are a response variable, an explanatory variable, an assurance level and a tolerable error. In such an example, the user chooses the response variable and the explanatory variable using a first drop-down menu and a second drop-down menu, respectively. Furthermore, the user inputs the assurance level using a slider, and inputs the tolerable error using an input field, wherein the user provides the data in the input field manually, via a keyboard of the user device or a virtual keyboard rendered upon the interactive user interface.

The at least one output interface element enables the time series planning, evaluation and prediction system to present to the user, the time series chart representing the variation in the response variable with respect to time. The time series chart indicates the upper acceptance bound and the lower acceptance bound of data points in the time series chart. The time series chart is generated for the plurality of samples associated with the given use case based upon the input data, the plurality of audit parameters and the at least one explanatory variable. Notably, the time series chart depicts a plurality of data points, wherein each data point corresponds to data values of the response variable varying over time for a given sample. Therefore, the number of the data points depicted in the time series chart is equal to the number of the plurality of samples associated with the given use case.

In an exemplary implementation of the at least one output interface element, prior data values (associated with the response variable) are depicted as light circles whereas the expected data values (associated with the response variable) are depicted as darkened circles. The prior data values are separated from the expected data values by way of a vertical line.

Notably, a prediction of the response variable is a function of the at least one explanatory variable. Furthermore, the response variable and the at least one explanatory variable belong to the set of variables. It will be appreciated that the terms "response variable" and "explanatory variable" may also be referred to as an "output variable" and "input variable" respectively.

Optionally, the at least one output interface element that enables the time series planning, evaluation and prediction system to present the prediction of the response variable to the user, is implemented by way of a statistical representation (for example, such as a scatter plot). More optionally, the statistical representation indicates the prediction of the response variable with respect to the regression line. Furthermore, the term "regression line" relates to a line that models the prediction of the response variable as a function of the at least one explanatory variable. In other words, the regression line is understood to be a line that best fits (namely, closely represents) a distribution of the plurality of data points, in a manner that a cumulative distance of the plurality of data points from the regression line is a minimum. It will be appreciated that the regression line could be a straight line or a curve.

Moreover, the terms "upper acceptance bound" and "lower acceptance bound" relate to a maximum acceptable limit and a minimum acceptable limit of permissible misstatements within the plurality of samples respectively, that are acceptable while obtaining the audit evidence. Specifically, the upper acceptance bound and the lower acceptance bound define an acceptance range (or an acceptance interval) therebetween, wherein samples that fall within (namely, lie within) the acceptance range, are considered acceptable for obtaining the audit evidence (namely, samples having none or an acceptable degree of error).

Furthermore, the upper acceptance bound and the lower acceptance bound are identified based upon the input data, the plurality of audit parameters and the at least one explanatory variable. Notably, the upper acceptance bound and the lower acceptance bound are a function of the prediction of the response variable (and therefore, a function of the at least one explanatory variable). In an example, the upper acceptance bound and the lower acceptance bound are identified based upon the tolerable error and the at least one explanatory variable. In such an example, the greater the tolerable error, the greater is the acceptance range defined between the upper acceptance bound and the lower acceptance bound. In such an example, a magnitude of the upper acceptance bound and a magnitude of the lower acceptance bound are determinable by way of the at least one explanatory variable. In another example, the upper acceptance bound and the lower acceptance bound are identifiable based upon the assurance level to be achieved and the at least one explanatory variable. In such an example, the greater the assurance level to be achieved, the smaller is the acceptance range defined between the upper acceptance bound and the lower acceptance bound. In such an example, a magnitude of the upper acceptance bound and a magnitude of the lower acceptance bound are determined by way of the at least one explanatory variable.

Optionally, the aforesaid time series planning, evaluation and prediction system is operable to calculate the upper acceptance bound and the lower acceptance bound by employing at least one of: a mathematical formula, an artificial intelligence algorithm. In such an example, the mathematical formula and the artificial intelligence algorithm are functions of the plurality of audit parameters and the at least one explanatory variable. Optionally, the at least one output interface element presents to the user, a calculation of the upper acceptance bound and the lower acceptance bound.

It will be appreciated that the at least one output interface element that enables the time series planning, evaluation and prediction system to present the time series chart to the user, is implemented by way of a statistical representation (for example, such as a scatter plot).

Optionally, the aforesaid time series planning, evaluation and prediction system is operable to calculate a coefficient of determination associated with the scatter plot indicating the prediction of the response variable, wherein the coefficient of determination pertains to a distribution of a given plurality of data points with respect to the regression line in the aforesaid scatter plot, and wherein a given data point corresponds to a given data value of the response variable and a given value of the at least one explanatory variable, for a given sample. Notably, the coefficient of determination associated with the aforesaid scatter plot can also be referred to as "R-squared measure". Furthermore, higher the value of the coefficient of determination, closer (namely, more accurate fitted) is the distribution of a given plurality of data points with respect to the regression line. Moreover, the coefficient of determination is generally expressed as a percentage, and therefore, its value ranges from 0% to 100%. Optionally, the at least one output interface element presents to the user, a coefficient of determination associated with the scatter plot indicating the prediction of the response variable.

The at least one output interface element enables the time series planning, evaluation and prediction system to present to the user, the key items, wherein the key items are identified as samples that fall outside the upper acceptance bound and the lower acceptance bound in the time series chart. Notably, the term "key items" relates to samples (and specifically, data points corresponding to the samples)

depicted in the time series chart that lie outside the acceptance range defined between the upper acceptance bound and the lower acceptance bound. It will be appreciated that such key items are considered to have substantial misstatement associated therewith, and are susceptible to being considered to be inacceptable audit evidence by the user.

Optionally, the at least one output interface element provides the time series chart in a manner that the key items are depicted distinctly with respect to samples that fall within the upper acceptance bound and the lower acceptance bound in the time series chart. In such an example, the at least one output interface element employs, for example, different colours, shapes, symbols, and so forth, to distinguish the key items from the samples that fall within the upper acceptance bound and the lower acceptance bound in the time series chart. Typically, the aforesaid visual dissimilarity facilitates the user to conveniently identify the key items in a glimpse.

In an exemplary implementation of the at least one output interface element, the samples that fall within the upper acceptance bound and the lower acceptance bound in the time series chart are beneficially depicted using yellow colour. In such an example, the key items, lying outside the upper acceptance bound and the lower acceptance bound, are beneficially depicted using red colour.

Optionally, the at least one output interface element presents to the user, a calculation of the key items that are required to be tested, based upon the upper acceptance bound and the lower acceptance bound. Optionally, in this regard, at the interactive user interface, the aforesaid calculation of the key items is represented in form of alphanumeric text or an image.

Optionally, the at least one output interface element presents to the user, a number of the key items that are required to be tested. In such an example, the number of the key items that are required to be tested can be considered to be an output presented (for example, as text) to the user by the automated or semi-automated time series planning, evaluation and prediction system.

Optionally, the at least one output interface element presents to the user, a number of the remaining samples associated with the given use case that are to be subsequently analysed for obtaining the audit evidence. Such number of the remaining samples is determined based upon at least one of: (i) the plurality of audit parameters, (ii) the identified key items.

Optionally, the at least one input interface element further enables the user to adjust the plurality of audit parameters for the audit evidence, and the at least one output interface element further enables the time series planning, evaluation and prediction system to iteratively present (a) and (b) to the user, for the plurality of adjusted audit parameters. When the user adjusts the plurality of audit parameters, the upper acceptance bound and the lower acceptance bound which are based upon such audit parameters, also change. As a result, the generated time series chart to be presented to the user also changes, leading to a subsequent change in the key items.

In an example, the user may adjust the tolerable error using an input interface element, such as an input field.

In another example, the user adjusts the assurance level to be achieved by way of an input interface element, such as a slider. In such an example, the user is able to set a desired assurance level by positioning a cursor of the slider between an upper and a lower limit of the slider.

In yet another example, the user is able to adjust the assurance level to be achieved by way of an input interface element, such as an input field.

In still another example, the user is able to adjust the response variable and/or the at least one explanatory variable by way of an input interface element, such as a drop-down menu.

Optionally, the at least one input interface element provides an optimisation option that, when selected by the user, optimises the plurality of audit parameters in a manner such that an expected audit effort is minimized. Notably, the optimisation option that, when selected by the user, optimises the assurance level in a manner that the expected audit effort is minimized. Optionally, the at least one input interface element is implemented as the user-selectable object, to provide the optimisation option. Furthermore, the optimisation option finds an optimal combination of the plurality of audit parameters that optimises the plurality of audit parameters that allow for generating an optimal time series chart having a minimum number of total items, thereby minimizing the expected audit effort. In an example, the expected audit effort is minimized when an optimal balance is found between the number of identified key items to be tested and the number of remaining samples to be analysed.

In an example, the at least one input interface element is implemented as the user-selectable object, for example such, as a user-selectable button, to provide the optimisation option. In such an example, the user-selectable button may be labelled, for example, as 'Preset'.

Optionally, the input data comprises data values of a set of variables for the plurality of samples associated with the given use case, and wherein:

the at least one input interface element enables the user to select a variable of interest from the set of variables; and the at least one output interface element enables the time series planning, evaluation and prediction system to present to the user:

an impact of remaining variables of the set on the variable of interest, such impact being based upon relationships existing between the variables of the set; and inter-relations that exist between the remaining variables.

Notably, the "variable of interest" can be any given variable among the set of variables, whose relationships with other remaining variables of the set are to be analysed by the user. Notably, a given remaining variable is said to have a high impact on the variable of interest if there is a strong relationship between the given remaining variable and the variable of interest. Optionally, correlation coefficients between the variables of the set are calculated by using the time series planning, evaluation and prediction system, to determine the relationships existing between the variables of the set. Therefore, the impact of remaining variables of the set on the variable of interest is directly proportional to magnitude of correlation coefficients between the variable of interest and the remaining variables of the set. Furthermore, there may exist inter-relations between the remaining variables. Notably, such inter-relations potentially depend on the calculated correlation coefficients between the variables of the set.

Optionally, the response variable is the variable of interest.

In an example, the at least one input interface element is optionally implemented as a drop-down menu having a plurality of user-selectable options, each corresponding to one variable of the set of variables, for enabling the user to select the variable of interest. In such an example, the user is able click on the user-selectable option corresponding to the variable of interest for making the aforesaid selection.

Optionally, the at least one output interface element is implemented by way of a solar correlation representation to present to the user:
- the impact of remaining variables of the set upon the variable of interest, such impact being based upon relationships existing between the variables of the set; and
- the inter-relations that exist between the remaining variables.

Optionally, the solar correlation representation depicts the variable of interest to be arranged at a centre of the solar correlation representation, and a plurality of concentric orbits around the variable of interest, wherein each of the plurality of concentric orbits represents a distinct correlation coefficient, and wherein a given remaining variable is arranged on one of an orbit based upon a given correlation coefficient between the given remaining variable and the variable of interest. In such an example, the plurality of concentric orbits generally represents absolute values of correlation coefficients. It will be appreciated that in such an example, a specific remaining variable can be arranged in only one orbit, whereas a given orbit representing a given correlation coefficient potentially depicts zero, single, or multiple remaining variables therein. Notably, the given orbit is able to depict only those remaining variables therein that are associated with the variable of interest according to the given correlation coefficient. Furthermore, the aforesaid representation of the impact of the remaining variables on the variable of interest by way of the solar correlation representation is that it pertains to the time series planning operation associated with obtaining the audit evidence. Moreover, the solar correlation representation can be understood to pertain to the time series planning information.

Optionally, the plurality of concentric orbits is arranged around the variable of interest in a manner that a distance of a given orbit from the variable of interest is inversely proportional to its corresponding correlation coefficient. In other words, a first orbit representing a first correlation coefficient is arranged farther away from the variable of interest as compared to a second orbit representing a second correlation coefficient, if the first correlation coefficient is smaller than the second correlation coefficient.

In an embodiment, eleven concentric orbits are arranged around the variable of interest, wherein the eleven concentric orbits represent 1, 0.9, 0.8, 0.7, 0.6, 0.5, 0.4, 0.3, 0.2, 0.1 and 0 correlation coefficients. In another embodiment, ten concentric orbits are arranged around the variable of interest, wherein the ten concentric orbits represent 0.9, 0.8, 0.7, 0.6, 0.5, 0.4, 0.3, 0.2, 0.1 and 0 correlation coefficients. In yet another embodiment, five concentric orbits are arranged around the variable of interest, wherein the five concentric orbits represent 0.8, 0.6, 0.4, 0.2 and 0 correlation coefficients.

As an example, in the aforesaid example describing the given use case UC having the set of nine variables V1-V9 pertaining thereto, the variable V1 is the variable of interest and the variables V2, V3, V4, V5, V6, V7, V8 and V9 are the remaining variables of the set of nine variables V1-V9 having correlation coefficients 0, 0.3, 0.9, 0.5, 0.9, 0.9, 0.7 and 0.7 respectively, with respect to the variable of interest V1. In such an example, a solar correlation representation SOL pertaining to the given use case UC is able to represent the variable V1 arranged at a centre of the solar correlation representation SOL, and ten concentric orbits arranged around the variable V1. Therefore, the variable V2 is arranged in an orbit representing 0 correlation coefficient, the variable V3 is arranged in an orbit representing 0.3 correlation coefficient, the variable V5 is arranged in an orbit representing 0.5 correlation coefficient, the variable V8 and V9 are arranged in an orbit representing 0.7 correlation coefficient, and the variables V4, V6 and V7 are arranged in an orbit representing 0.9 correlation coefficient. It will be appreciated that in such an example, the orbits representing 0.1, 0.2, 0.4, 0.6 and 0.8 correlation coefficients, are empty.

Optionally, an arrangement of the remaining variables in the solar correlation representation represents the inter-relations that exist between such remaining variables. Optionally, in this regard, in the solar correlation representation, an arrangement of the remaining variables about the variable of interest represents the inter-relations that exist between the remaining variables. Notably, variables lying on opposite sides of the variable of interest are potentially not inter-related whereas variables lying on the same side of the variable of interest are potentially inter-related. It will be appreciated that such a manner of representing the inter-relations that exist between the remaining variables is not limited to representing inter-relations of variables lying on a same orbit only, but can also be employed for representing inter-relations of variables lying on separate orbits.

Optionally, for a plurality of remaining variables that are arranged on a same orbit of the solar correlation representation, a distance (namely, a separation) between the plurality of remaining variables is directly proportional to a degree (namely, a strength) of inter-relations that exist therebetween. As an example, three variables X1, X2 and X3 are arranged on a single orbit, wherein the variables X1 and X3 are arranged close to each other, and substantially away from the variable X2. In such an example,
- (i) the variables X1 and X3 potentially have a strong inter-relation there between,
- (ii) the variables X1 and X2 potentially have a weak inter-relation there between, and
- (iii) the variables X3 and X2 potentially have a weak inter-relation there between.

Optionally, the at least one output user interface implemented to depict a solar correlation can be adjusted in order to customize the appearance of the representation. Furthermore, customizing the appearance of the solar correlation can enhance the interpretation of the representation. In an example, the representation can be depicted using different colours. In an example, the representation can be depicted using different symbols.

Optionally, the at least one output interface element enables the time series planning, evaluation and prediction system to present to the user, a distribution of the data values of the variable of interest. It will be appreciated that provision of the aforesaid distribution of the data values of the variable of interest, allows for the user to understand and analyse the variable of interest in a user-friendly manner. As an example, the distribution of the data values of the variable of interest can be implemented by way of a histogram.

Optionally, the at least one explanatory variable is at least one of: a variable from the set of variables, an external variable, a time-dependent variable. Notably, the variable from the set of variables can also be referred to as an internal variable of the use case. The term, "external variable" relates to a given variable other than the variable from the set of variables. Such an external variable is not provided by the user. Notably, the external variable supports the auditor to obtain audit evidence. In an example, the external variable is optionally a monthly production index of durable goods manufactured by various manufacturers in a given country. In such an example, the monthly production index of durable goods can be employed to determine revenue of a single manufacturer of the given country. Furthermore, in such an example, such external variables can be referred to as economic indicators. Moreover, such economic indicators can be obtained for various industrial sectors in the given country. Examples of such an external variable include, but are not limited to, rental of the client property, number of employees and/or customers associated with the client. Moreover, the term "time-dependent variable" relates to a given variable that changes with respect to time. Notably, the time-dependent variables relate to trends and/or yearly patterns with respect to which the variable changes. In an example, a time-dependent variable "Dec" has a data value "1" for December and a data value "0" for all other months. In another example, a time-dependent variable "Trend" has a data value "1" for January, a data value "2" for February, a data value "3" for March and so on. In such an example, the data values of the time-dependent variable "Trend" are arranged in increasing order of time. Optionally, the time-dependent variables can be used as the external and internal variables to explain the response variable. In one example, the variable can show steady increase over past years. In another example, the variable can be constantly low in winters and high in summers. Such time-dependent variables are directly created from the time structure of the input data.

Optionally, for prediction of the response variable with respect to the at least one explanatory variable, the server arrangement can employ time-dependent variable, external variable or any combination thereof.

Optionally, at the interactive user interface, the at least one input interface element enables the user to select the at least one explanatory variable from at least one of: the variable from the set of variables, the external variable, the time-dependent variables. Optionally, in this regard, the at least one explanatory variable is selected by way of at least one of: a user-selectable icon, a user-selectable button, an input field, a slider, a drop-down menu.

Optionally, the at least one output interface element enables the time series planning, evaluation and prediction system to present to the user, an influence of the at least one explanatory variable on the estimation of the response variable. Notably, the at least one output interface element presents the influence of the at least one explanatory variable on estimation of the response variable to the user, by way of a bar chart. The bar chart is generated for the plurality of samples associated with the given use case, based upon the time series chart. Notably, such a bar chart depicts the influence on one axis (for example, its vertical axis) and an index of samples on another axis (for example, its horizontal axis). Such a representation depicting along the Y axis the influence of the at least one explanatory variable on estimation of the response variable and the time is depicted along the X axis. In an example, the influence of the at least one explanatory variable on estimation of the response variable can vary between 0 and 1. It will be appreciated that samples having a large influence associated therewith, can introduce a significant bias into the aforesaid time series analysis.

Optionally, the at least one output interface element enables the time series planning, evaluation and prediction system to present to the user, an influence summary describing the influence of the at least one explanatory variable upon the response variable, for the plurality of samples associated with the given use case. Optionally, in this regard, the influence summary comprises calculated influence values pertaining to the plurality of samples. The influence summary can be implemented by at least one of table, text, or list.

Optionally, at the interactive user interface:

the at least one input interface element enables the user to input at least one forecasting variable, wherein the at least one forecasting variable is at least one of: an external variable, a time-dependent variable; and the at least one output interface element that enables the time series planning, evaluation and prediction system to present to the user:

a forecast time series chart representing a variation in a given variable with respect to time by way of a plurality of prior, current and forecasted data values of the given variable, wherein the forecast time series chart indicates an expected upper acceptance bound and an expected lower acceptance bound of data points in the forecast time series chart, the expected upper acceptance bound and the expected lower acceptance bound being identified based upon the plurality of audit parameters and the at least one forecasting variable; and unexpected data values from amongst the plurality of forecasted data values of the given variable, wherein the unexpected data values are identified as data points that fall outside the expected upper acceptance bound and the expected lower acceptance bound in the forecast time series chart.

In such a case, the server arrangement is configured to obtain forecast data for variation in data values of the given variable over a given future time period, the given variable being one variable among the set of variables.

The term "forecast data" relates to predicted (namely, estimated) data values of a given variable over a given future time period. Notably, the forecast data is predicted based upon existing trends and/or yearly pattern with respect to which the given variable is varying over time.

Optionally, the forecast time series chart represents the variation of the given variable with respect to time by way of the plurality of prior, current and forecasted data values of the given variable. Notably, a prediction of the given variable is a function of the at least one forecasting variable. Furthermore, the forecast time series chart depicts a plurality of data points, wherein each data point corresponds to data values of the given variable with respect to time for a given sample. Therefore, a number of the data points depicted in the forecast time series chart is equal to a number of the plurality of samples associated with the given use case. Notably, the forecasted data values of the given variable are predicted based upon the plurality of prior and current data values of the given variable. As an example, a given future time period for which the forecast data is to be obtained can be of one year for example, such as from January 2019 to December 2019. In such an example, the system predicts the plurality of forecasted data values for the given future period based upon the plurality of prior and current data values for two years (for example, such as data values for 24 months from January 2017 to December 2018). Notably, the given variable and the at least one forecasting variable belong to the set of variables. Furthermore, the at least one forecasting variable is always provided for the response variable. In an example, the given variable can be the response variable. In another example, the given response variable can be any other variable of the set of variables in the input data. Notably, in the forecast time series chart, the plurality of prior and current data values are depicted as light circles whereas the plurality of forecasted data values are depicted as darkened circles. The prior and current data values are separated from the forecasted data values by way of a vertical line.

Optionally, the at least one forecasting variable is at least one of: an external variable, a time-dependent variable.

Moreover, the terms "expected upper acceptance bound" and "expected lower acceptance bound" relate to a maximum expected acceptable limit and a minimum expected acceptable limit of permissible misstatements within the plurality of samples respectively, that are acceptable while obtaining the forecast data. Specifically, the expected upper acceptance bound and the expected lower acceptance bound define an acceptance range (or an acceptance interval) therebetween, wherein samples that fall within (namely, lie within) the acceptance range, are considered acceptable for obtaining the forecast data (namely, samples having none or an acceptable degree of error).

Furthermore, the expected upper acceptance bound and the expected lower acceptance bound are identified based upon the forecast data, the plurality of audit parameters and the at least one forecasting variable. Notably, the expected upper acceptance bound and the expected lower acceptance bound are a function of the prediction of the given variable (and therefore, a function of the at least one forecasting variable). In an example, the expected upper acceptance bound and the expected lower acceptance bound are identified based upon the tolerable error and the at least one forecasting variable. In such an example, the greater the tolerable error, the greater is the acceptance range defined between the expected upper acceptance bound and the expected lower acceptance bound. In such an example, a magnitude of the expected upper acceptance bound and a magnitude of the expected lower acceptance bound are determined by way of the at least one forecasting variable. In another example, the expected upper acceptance bound and the expected lower acceptance bound are identified based upon the assurance level to be achieved and the at least one forecasting variable. In such an example, the greater the assurance level to be achieved, the smaller is the acceptance range defined between the expected upper acceptance bound and the expected lower acceptance bound. In such an example, a magnitude of the expected upper acceptance bound and a magnitude of the expected lower acceptance bound are determinable by way of the at least one forecasting variable.

Optionally, the aforesaid time series planning, evaluation and prediction system is operable to calculate the expected upper acceptance bound and the expected lower acceptance bound by employing at least one of: a mathematical formula, an artificial intelligence algorithm. In such an example, the mathematical formula and the artificial intelligence algorithm are functions of the plurality of audit parameters and the at least one forecasting variable. Optionally, the at least one output interface element presents to the user, a calculation of the expected upper acceptance bound and the expected lower acceptance bound. It will be appreciated that the at least one output interface element that enables the time series planning, evaluation and prediction system to present the forecast time series chart to the user, is implemented by way of a statistical representation (or example, such as a scatter plot).

The at least one output interface element enables the time series planning, evaluation and prediction system to present to the user, the unexpected data values, wherein the unexpected data values are identified as samples that fall outside the expected upper acceptance bound and the expected lower acceptance bound in the time series chart. Notably, the term "unexpected data values" relates to samples (and specifically, data points corresponding to the samples) depicted in the forecast time series chart that lie outside the acceptance range defined between the expected upper acceptance bound and the expected lower acceptance bound.

Optionally, the at least one output interface element provides the forecast time series chart in a manner that the unexpected data values are depicted distinctly with respect to samples that fall within the expected upper acceptance bound and the expected lower acceptance bound in the forecast time series chart. In such an example, the at least one output interface element employs, for example, different colours, shapes, symbols, and so forth, to distinguish the unexpected data values from the samples that fall within the expected upper acceptance bound and the expected lower acceptance bound in the forecast time series chart. Typically, the aforesaid visual dissimilarity facilitates the user to conveniently identify the unexpected data values at a glance.

Optionally, the at least one output interface element enables the time series planning, evaluation and prediction system to present to the user, maximum achievable assurance level for the data values of the given variable over a given future time period, such maximum achievable assurance level being based upon an average prediction error for forecast data for variation in data values of the given variable over the given future time period. In such an example, the objective prediction function for the given variable is determined. Furthermore, the objective prediction is determined comprising predicted data values of the given variable over the given future time period. Additionally, an average prediction error for the forecast data is determined based upon such objective prediction.

Optionally, the maximum achievable assurance level for a total rate of change of the data values of the given variable over the given future time period is presented to the user. Notably, the maximum achievable assurance level relates to a maximum level of confidence that is to be achieved pertaining to accuracy of a total sum of the given variable for the future period. As an example, when the user predicts monthly values for the given variable for the future period, all the predicted values are added to the system. In such an example, the maximum achievable assurance level is determined for the total sum of the given variable for the future period, thereby allowing the system to calculate the expected upper acceptance bound and expected the lower acceptance bound. Furthermore, greater the difference between the prediction of the user and the prediction of the system of the given variable over the given future time period, greater the average prediction error is to be calculated by the system. As a result, the maximum achievable assurance level for the data values of the given variable decreases.

Optionally, the at least one output interface element enables the time series planning, evaluation and prediction system to present to the user, a comprehensive summary of the audit evidence, wherein the comprehensive summary indicates at least a status of the plurality of samples associated with the given use case, the status indicating whether or not a given sample is a key item pertaining to the audit evidence. In such a case, the comprehensive summary of the audit evidence can be implemented by at least one of: table, text, or list. Notably, the comprehensive summary can be understood to be an output of the time series planning, evaluation and prediction system. It will be appreciated that the at least one output interface element allows for providing the comprehensive summary in a systematic and user-friendly manner.

DETAILED DESCRIPTION OF THE DRAWINGS

Referring to FIG. 1, there is shown an illustration of a network environment 100 wherein a system is implemented that, when in operation, performs time series planning, evaluation and prediction, in accordance with different embodiments of the present disclosure. Notably, the network environment 100 includes: a server arrangement 102 including at least one server, a communication network 104, a user device 106 associated with a user of the automated or semi-automated time series planning, evaluation and prediction system, and a source 108 of input data. Furthermore, the server arrangement 102 is coupled in communication with a time series analysis module for performing time series analysis operations. The time series analysis module is beneficially implemented by employing a configuration of field-programmable gate arrays (FPGAs) and reduced instruction set (RISC) computers. As shown, in the network environment 100, the server arrangement 102 is coupled in communication with the user device 106 via the communication network 104.

The server arrangement 102 is shown implemented as a configuration of modules. Beneficially, the modules comprise a data input module 250, a validation module 252, an interactive user interface module 254, a data analysis module 256 and an identification module 258. These modules 250 to 258 mutually interact when in operation, and exchange data therebetween. Moreover, the modules 250 to 258 are optionally implemented in custom-designed hardware, in software executable on computing hardware, or a combination of such custom-designed hardware and software. For example, the custom-designed hardware employs FPGA's that have been configured via their gate connections to implement data processing as described in the foregoing. Such a modular design enables the server arrangement 102 to be conveniently reconfigured and updated as more effective algorithms are developed for the system.

Implementing the system by use of the modules 250 to 258 enables operational components of the system to be optimized for computing efficiency, data memory utilization and responsiveness. Moreover, use of such specialized modules allows for easier upgrading of the system as new computing hardware becomes available. For example, data exchange between the modules 250 to 258 is beneficially implemented in an encrypted form to reduce a risk of unauthorized third-party eavesdropping. Such encryption is beneficially achieved using a combination of encryption and obfuscation of data, and corresponding decryption and de-obfuscation of data which provides substantially a one-time pad level of data security within the system. The obfuscation is optionally achieved by implementing selective nibble swaps of data bytes within a given encrypted data, a recorded in a data map shared between the modules 250 to 258. Such a high level of data security is highly beneficial when one or more of the modules 250 to 258 are implemented in a cloud-computing environment where there is a risk of third-party malicious cyberattacks.

It will be appreciated that FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of user devices, servers, sources of input data, and communication networks. A person skilled in the art will recognize many variations, alternatives, and modifications of embodiments of the present disclosure.

The system of FIG. 1, when in operation, executes time series planning, evaluation and prediction to obtain audit evidence, the system being automated or semi-automated, and the system comprising a server arrangement 102 that includes the plurality of modules 250 to 258; the modules include:

(a) the data input module 250 that, when in operation, obtains input data pertaining to a given use case for which the audit evidence is to be obtained, wherein the input data is in a time structured form, and wherein the input data comprises data values of a set of variables for a plurality of samples associated with the given use case;

(b) the validation module 252 that, when in operation, validates the input data based upon a predefined set of statistical rules;

(c) the interactive user interface module 254 that, when in operation, provides a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(d) the data analysis module 256 that, when in operation, generates a time series chart to be presented to the user via the interactive user interface and identify an upper acceptance bound and a lower acceptance bound of data points in the time series chart, the time series chart representing a variation in a response variable with respect to time, wherein the time series chart is to be generated for the plurality of samples, and wherein the upper acceptance bound and the lower acceptance bound are to be identified based upon the plurality of audit parameters and at least one explanatory variable; and (e) an identification module 258 that, when in operation, identifies, from amongst the plurality of samples, key items that are required to be tested, the key items being samples that fall outside the upper acceptance bound and the lower acceptance bound in the time series chart.

Figure 2A:
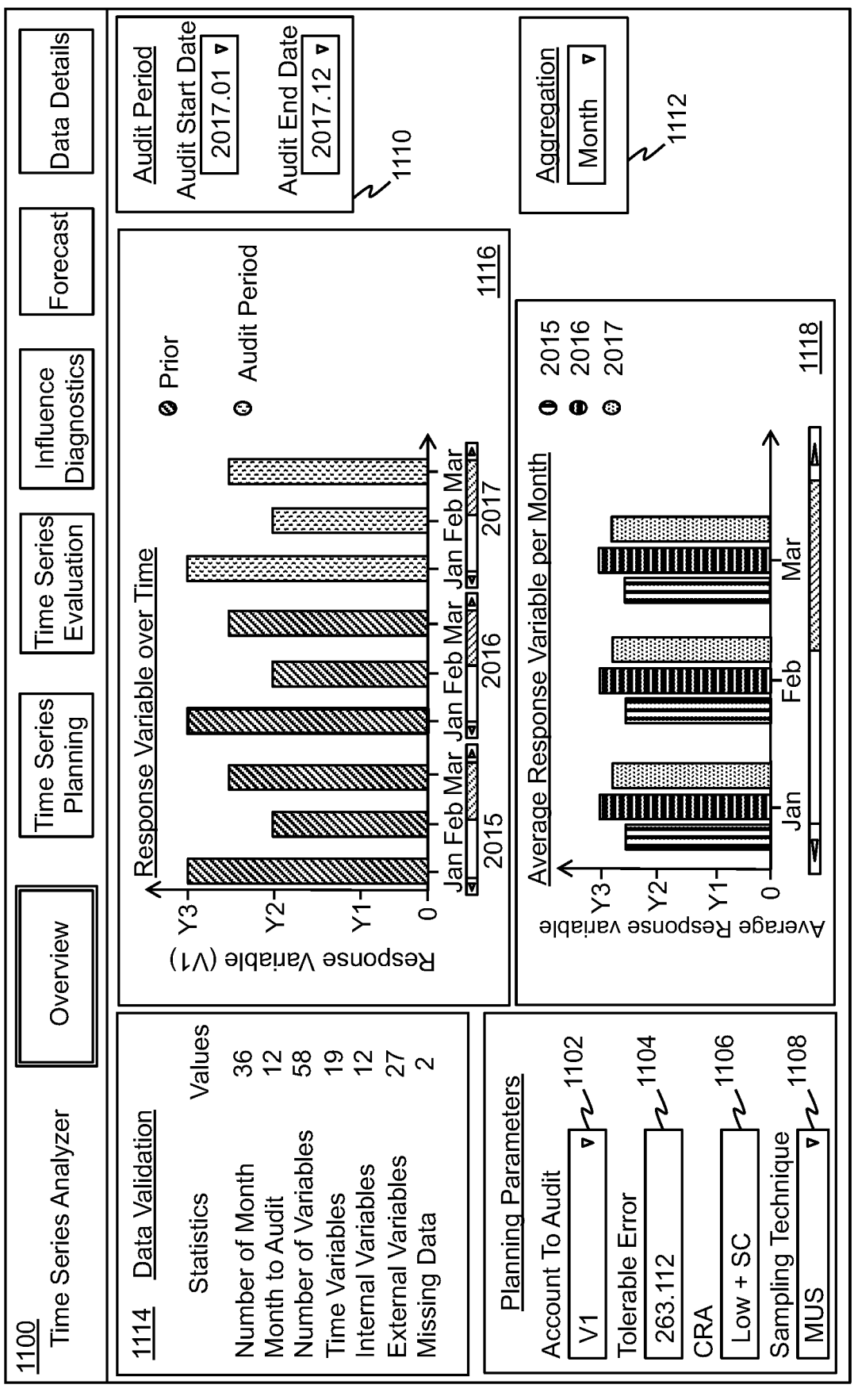
FIGS. 2A, 2B, 2C, 2D, 2E and 2F are illustrations of exemplary views of an interactive user interface to be presented to a user of the system of FIG. 1 that, when in operation, provides time series planning, evaluation and prediction, in accordance with different embodiments of the present disclosure.

Referring to FIG. 2A, there is shown an illustration of an overview tab of a time series analyser 1100, in accordance with an embodiment of the present disclosure; the overview tab is generated using the system of FIG. 1. As shown, the time structure tab comprises six input interface elements 1102, 1104, 1106, 1108, 1110 and 1112, and three output interface elements 1114, 1116 and 1118. The input interface element 1102 enables a user to select a response variable from a set of variables V1-V9 for a plurality of samples (for example, 36 samples) associated with a given use case. The input interface element 1102 is implemented by way of a drop-down menu having a plurality of user-selectable options (corresponding to each variable of the set of variables V1-V9). As shown, the user selects a user-selectable option corresponding to variable 'V1', to select the variable 'V1' as the response variable from among the set of variables V1-V9. The input interface element 1104 enables the user to input an audit parameter such as a tolerable error, via an input field. The tolerable error is a maximum acceptable error that can be associated with a given data value of a given variable among the set of variables for the plurality of samples associated with the given use case. The input interface element 1106 enables the user to input another audit parameter such as a combined risk assessment (CRA) by way of another drop-down menu having a plurality of user-selectable options (for example, such as 'LOW', 'MODERATE', and 'HIGH'). The input interface element 1108 enables the user to input yet another audit parameter such as a statistical sampling technique to be employed, by way of yet another drop-down menu. The input interface element 1110 enables the user to input still another audit parameter such as a time period for which audit evidence is to be obtained. As shown, the input interface element 1110 enables the user to input an audit start date (namely, the time span from which obtaining the audit evidence is started), by way of a drop-down menu, and an audit end date (namely, the time span from which obtaining the audit evidence is to end), by way of another drop-down menu. The input interface element 1112 enables the user to input another audit parameter such as a level of data aggregation, by way of yet another drop-down menu. The output interface element 1114 presents some descriptive statistics for the validated input data to the user, by way of a table. The output interface element 1116 presents a distribution of data values of the response variable 'V1' for the time period for which audit evidence is to be obtained and prior data values, by way of a statistical representation such as a bar chart. Furthermore, the output interface element 1118 presents an average distribution of data values of the response variable 'V1', by way of a statistical representation such as a bar chart.

Figure 2B:
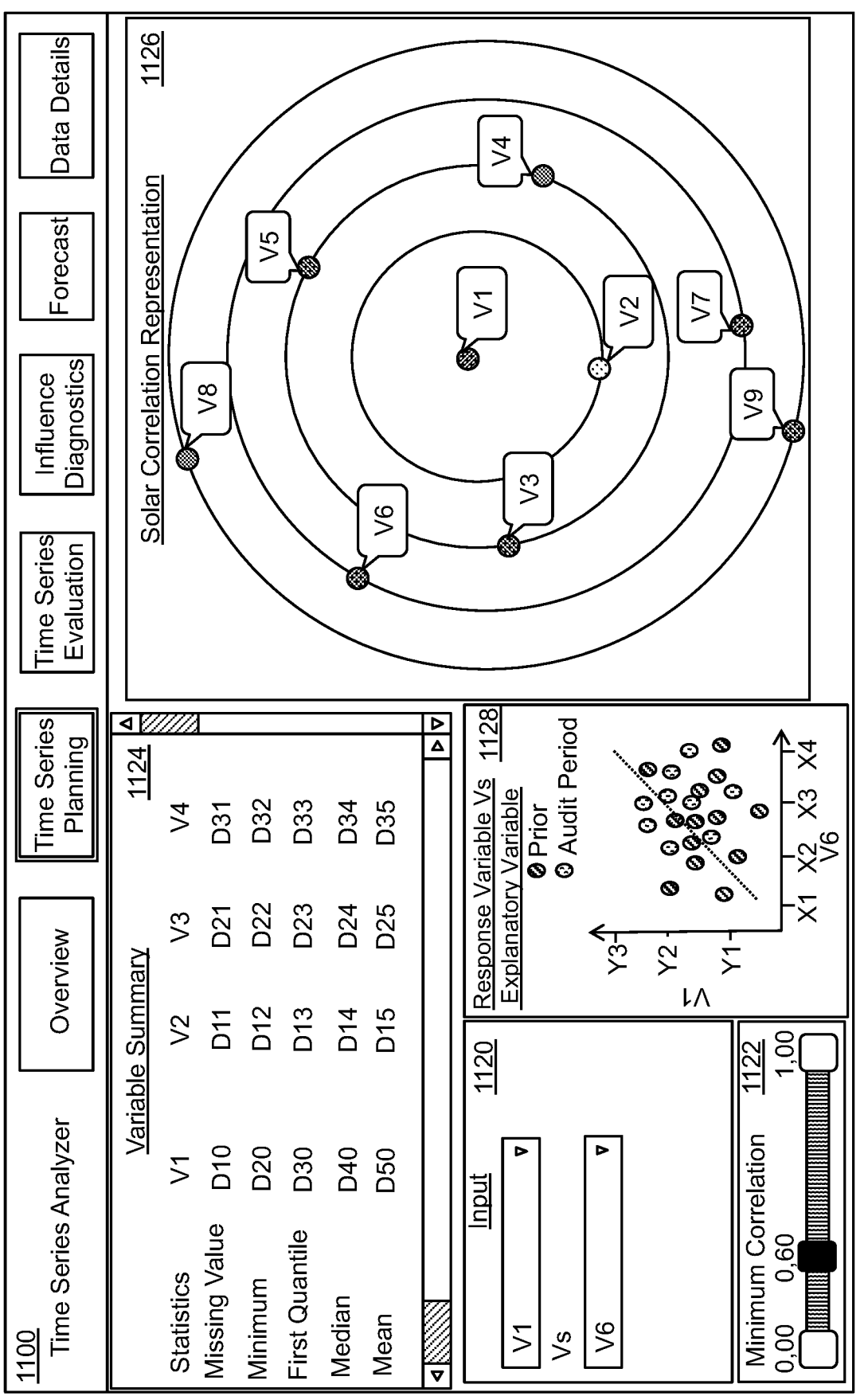

Referring to FIG. 2B, there is shown an illustration of a time series planning tab of the time series analyser 1100, in accordance with an embodiment of the present disclosure. As shown, the time series planning tab comprises two input interface elements 1120 and 1122, and three output interface elements 1124, 1126 and 1128. The input interface element 1120 enables the user to select the response variable and at least one explanatory variable, from amongst the set of variable V1-V9, by way of two menus, each having plurality of user-selectable options. As shown, the user selects a user-selectable option corresponding to the variable 'V1', to select the variable 'V1' as the response variable from among the set of variables V1-V9. Similarly, the user selects one explanatory variable by clicking a user-selectable option corresponding to the variable 'V6'. The input interface element 1122 enables the user to input a minimum correlation level to be shown in element 1126, by way of a slider. The output interface element 1124 presents a variable summary that facilitates reconciliation of the input data, by way of a table. The output interface element 1126 represents an impact of remaining variables of the set (such as variables V2, V3, V4, V5, V6, V7, V8 and V9) upon the response variable V1 and inter-relations that exist between the remaining variables, by way of a statistical representation such as a solar correlation representation. The response variable V1 is arranged at a center of the solar correlation representation. The remaining variables are arranged in a plurality of concentric orbits around the response variable V1, wherein each of the plurality of concentric orbits represents a distinct correlation coefficient, and wherein a given remaining variable is arranged in an orbit based upon a given correlation coefficient between the given remaining variable and the response variable V1. Furthermore, the plurality of concentric orbits are arranged in a manner that a distance of a given orbit from the response variable V1 is directly proportional to its corresponding correlation coefficient. In such a scenario, the orbit including the variable V2 is associated with a higher correlation coefficient as compared to the orbit including the variable V4. The output interface element 1128 presents to the user, a statistical representation (for example, such as a scatter plot) depicting data points for the selected response variable V1 and the explanatory variable V6. As shown, the response variable V1 is depicted along the y-axis (namely, vertical axis) and the at least one explanatory variable V6 is depicted along the x-axis (namely, horizontal axis). Furthermore, the statistical representation indicates a regression line depicted as a dashed line.

Figure 2C:
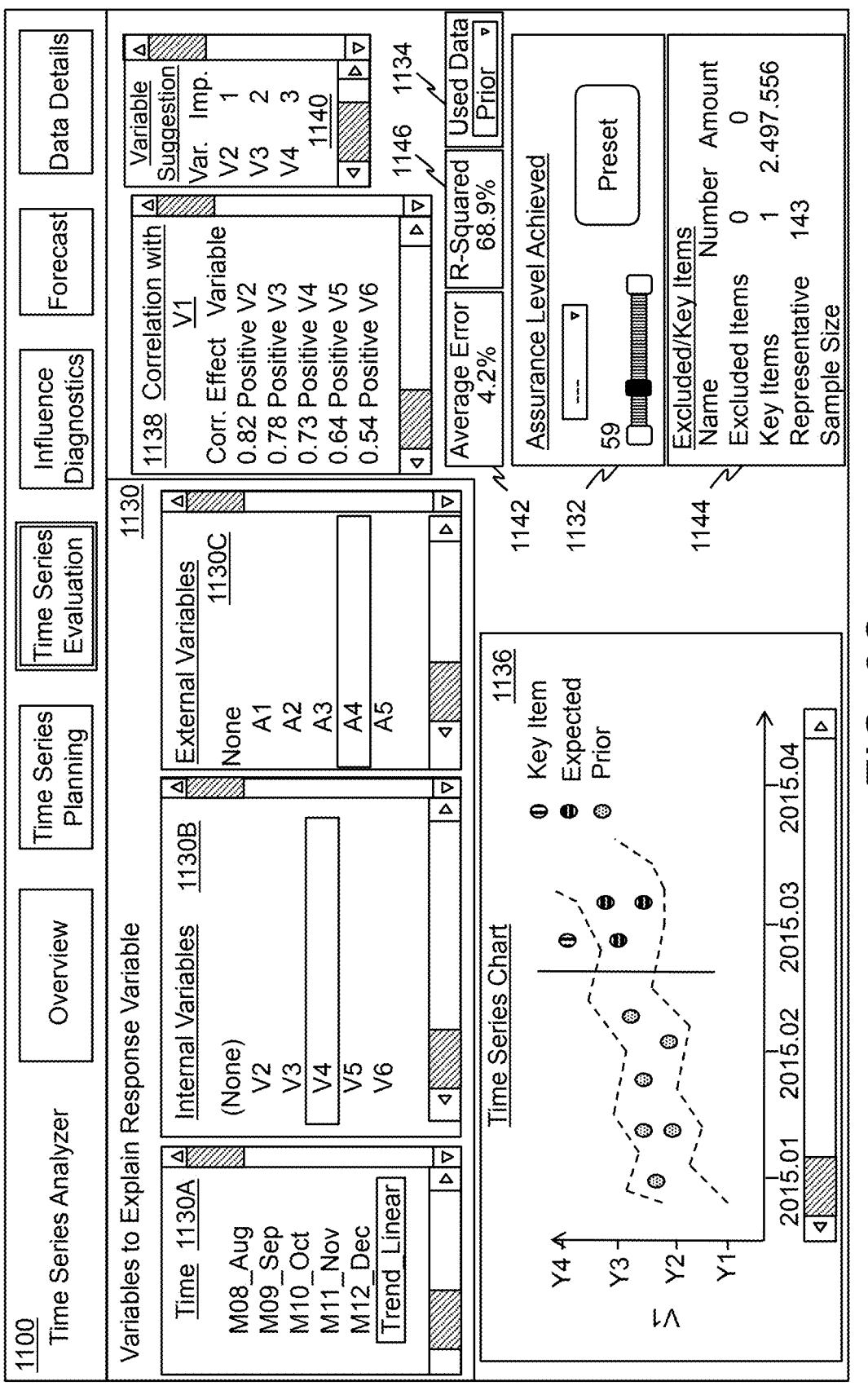

Referring to FIG. 2C, there is shown an illustration of a time series evaluation tab of the time series analyser 1100, in accordance with an embodiment of the present disclosure. As shown, the time series evaluation tab comprises three input interface elements 1130, 1132 and 1134, and six output interface elements 1136, 1138, 1140, 1142, 1144 and 1146. The input interface element 1130 enables the user to select variables (namely, the at least one explanatory variable) to explain the response variable, from amongst a set of time-dependent variables, a set of internal variables V1-V9 and a set of external variables A1-A5, by way of three drop-down box menus 1130A, 1130B and 1130C, respectively, each having plurality of user-selectable options. The input interface element 1132 enables the user to input an assurance level to be achieved, by way of the depicted drop-down menu and/or slider. Furthermore, the input interface element 1132 provides an optimisation option, by way of a user-selectable button 'Preset', which when selected by the user, optimises a plurality of audit parameters (such as the assurance level) in a manner that an expected audit effort is minimized. The input interface element 1134 enables the user to select which data values the system uses for the analysis (for example, such as Prior or "All Other"), by way of a drop-down menu. The output interface element 1136 presents to the user, a statistical representation such as a time series chart, which represents a variation of the response variable V1 with respect to time. Furthermore, the time series chart indicates an upper acceptance bound and a lower acceptance bound (depicted as dashed lines). Moreover, the time series chart is generated for the plurality of samples (notably, the exemplary 36 samples) associated with the given use case, based upon the input data and the plurality of audit parameters. Additionally, the time series chart depicts key items which are samples that fall outside the upper acceptance bound and the lower acceptance bound in the time series chart. Such key items are depicted by way of darkened circles in the time series chart. Furthermore, the time series chart depicts prior data values of the response variable V1 by way of doted circles, an expected data values of the response variable V1 by way of lined circles and a separation of the prior and the expected data values of the response variable by a way of solid line. The output interface element 1138 presents to the user, a correlation of a plurality of explanatory variables with the response variable, by way of a table. The output interface element 1140 presents to the user, variable suggestions depicting an importance of the plurality of explanatory variables with the response variable, by way of another table. The output interface element 1142 presents to the user, an average error, by a way of output field. The output interface element 1144 presents the user, a number of key items and excluded items to be tested and the corresponding amount, by way of a table. Furthermore, the output interface element 1144 presents the user, the representative sample size, by a way of another output field. The output interface element 1146 presents to the user, a coefficient of determination for example, such as R-squared measure, by a way of an output field.

Figure 2D:
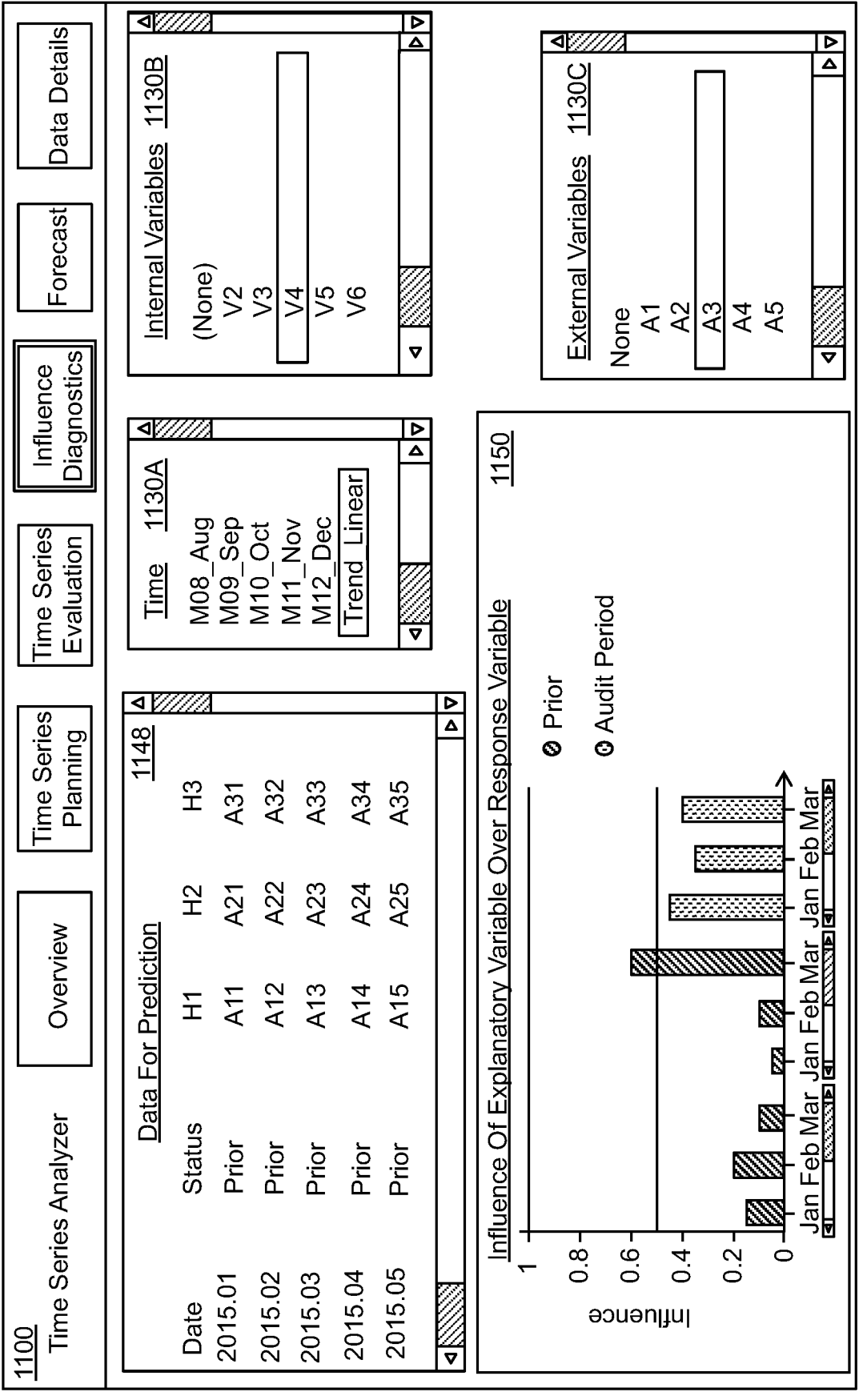

Referring to FIG. 2D, there is shown an illustration of an influence diagnostics tab of the time series analyser 1100, in accordance with an embodiment of the present disclosure. As shown, the influence diagnostics tab comprises three input interface elements 1130A, 1130B and 1130C, and two output interface elements 1148 and 1150. The input interface elements 1130A, 1130B and 1130C enable the user to select the at least one explanatory variable, from amongst the set of time-dependent variables, the set of internal variables V1-V9 and a set of external variables A1-A5, by way of three drop-down box menus, respectively, each having plurality of user-selectable options. The output interface element 1148 presents the user the data used for prediction of a given variable, by way of a table. The output interface element 1150 presents an influence of the at least one explanatory variable on estimation of the response variable, by way of a bar chart.

Figure 2E:
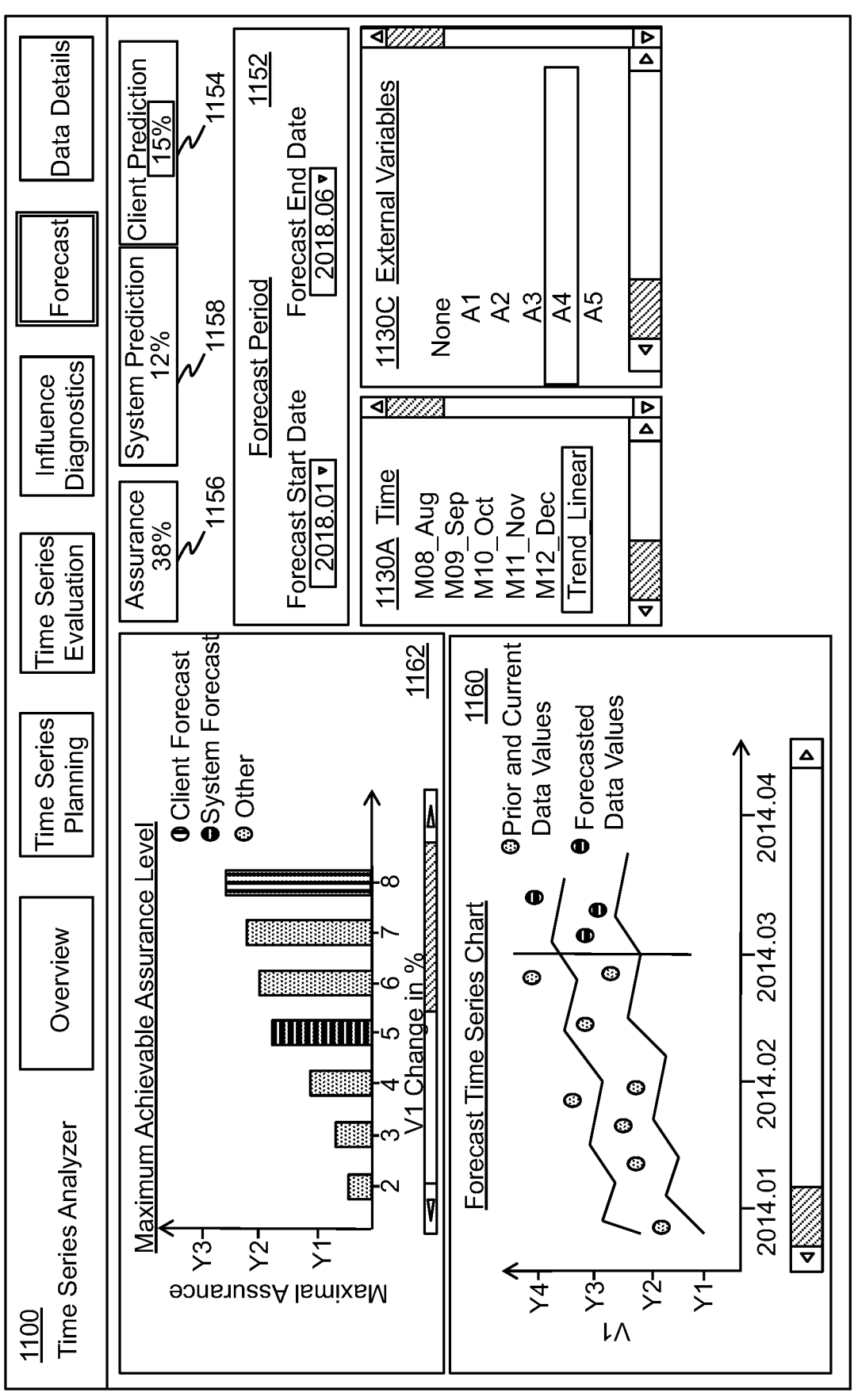

Referring to FIG. 2E, there is shown an illustration of a forecast tab of the time series analyser 1100, in accordance with an embodiment of the present disclosure. As shown, the forecast tab comprises four input interface elements 1130A, 1130C, 1152 and 1154, and four output interface elements 1156, 1158, 1160 and 1162. The input interface elements 1130A and 1130C enables the user to select the at least one explanatory variable, from amongst the set of time-dependent variables and the set of external variables A1-A5, by way of two drop-down box menus, respectively, each having plurality of user-selectable options. The input interface element 1152 enables the user to input a forecast period for which forecast data is to be obtained. As shown, the input interface element 1152 enables the user to input a forecast start date (namely, the time span from which obtaining the forecast data is to start), by way of a drop-down menu, and a forecast end date (namely, the time span from which obtaining the forecast data is to end), by way of another drop-down menu. The input interface element 1154 enables the user to input a client prediction, by a way of an input field. The output interface element 1156 presents the user the assurance level achieved for the forecast given by the client, by a way of an output field. The output interface element 1158 presents the user a system prediction, by a way of another output field. The output interface element 1160 presents the user a statistical representation such as a forecast time series chart, which represents a variation in the given variable 'V1' with respect to time by way of a plurality of prior, current and forecasted data values of the given variable. Furthermore, the forecast time series chart indicates an expected upper acceptance bound and an expected lower acceptance bound (depicted as dashed lines). Moreover, the forecast time series chart is generated for the plurality of samples (notably, the exemplary 36 samples) associated with the given future time period, based upon the forecast data and the plurality of audit parameters. Additionally, the forecast time series chart depicts unexpected data values which are data points that fall outside the expected upper acceptance bound and the expected lower acceptance bound in the forecast time series chart.

Furthermore, the forecast time series chart depicts prior and current data values of the given variable V1 by way of doted circles, forecasted data values of the given variable V1 by way of lined circles. Moreover, the prior and current data values are separated from the forecasted data values of the given variable by a way of solid line. The output interface elements 1162 presents to the user, the maximum achievable assurance level for the future change rate of the given variable over the given future time period, by way of a statistical representation such as a bar chart.

Figure 2F:
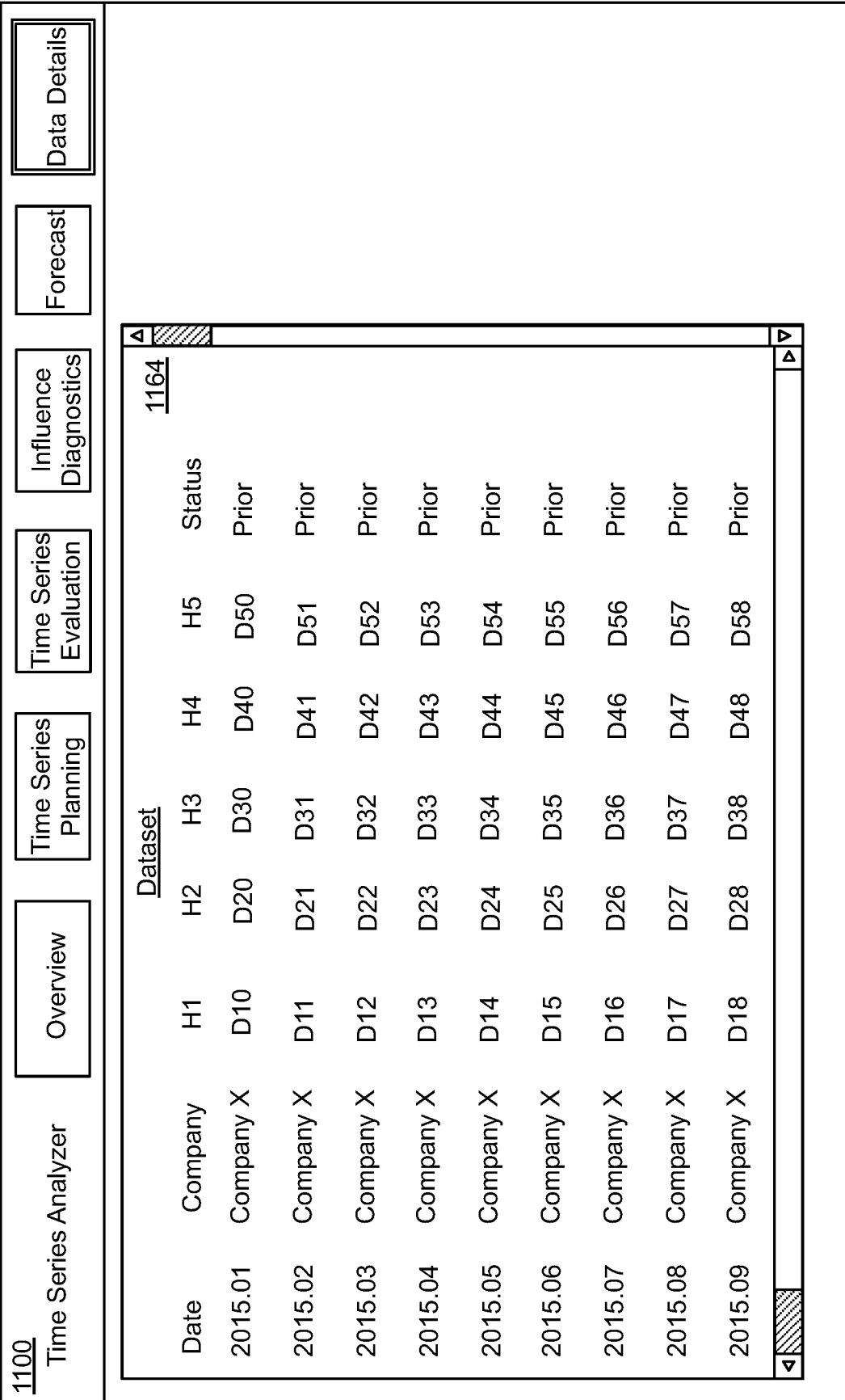

Referring to FIG. 2F, there is shown an illustration of a data details tab of the time series analyser 1100, in accordance with an embodiment of the present disclosure. As shown, the data details tab comprises an output interface element 1164. The output interface element 1164 presents the user the obtained input data, by way of the table that comprises the data values of the set of variables for the plurality of samples associated with the given use case.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system of a time series planning, evaluation and prediction, comprising:

at least one processing device; and a memory storing instructions that, when executed by the at least one processing device, cause the system to:

generate an interactive user interface for obtaining audit evidence, based upon input data pertaining to a given use case, the input data being in a time structured form, the interactive user interface comprising:

(i) at least one input interface element configured to:

enable a user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation, wherein the assurance level is provided by the user via an adjustment of a slider on the interactive user interface; and enable the user to adjust the plurality of audit parameters for the audit evidence; and (ii) at least one output interface element configured to enable the system to present to the user:

(a) a time series chart representing a variation in a response variable with respect to time, wherein the time series chart indicates an upper acceptance bound and a lower acceptance bound of data points in the time series chart, and wherein the time series chart is generated for a plurality of samples associated with the given use case based upon the input data, the plurality of audit parameters and at least one explanatory variable; and (b) key items, wherein the key items are identified as samples that fall outside the upper acceptance bound and the lower acceptance bound in the time series chart, wherein the interactive user interface dynamically updates the time series chart and acceptance bounds in real-time based on the user adjusted plurality of audit parameters for the audit evidence;

wherein the input data comprises data values of a set of variables for the plurality of samples associated with the given use case, and wherein:

the at least one input interface element enables the user to select a variable of interest from the set of variables; and the at least one output interface element enables the system to present to the user:

an impact of remaining variables of the set on the variable of interest, such impact being based upon relationships existing between the variables of the set; and inter-relations that exist between the remaining variables;

wherein the system is configured to calculate correlation coefficients between the variables of the set to determine the relationships existing therebetween; and wherein the system is configured to automatically select the time period for which the audit evidence is to be obtained by using an artificial intelligence algorithm;

wherein the system further comprises a server arrangement that includes a plurality of modules, wherein the modules include:

(a) a data input module configured to obtain the input data;

(b) a validation module configured to validate the input data based upon a predefined set of statistical rules;

(c) an interactive user interface module configured to provide the user with the interactive user interface;

(d) a data analysis module configured to generate the time series chart to be presented to the user via the interactive user interface and identify the upper acceptance bound and the lower acceptance bound of data points in the time series chart;

(e) an identification module configured to identify, from amongst the plurality of samples, the key items that are required to be tested;

wherein data exchange between the modules (a) to (e) is implemented in an encrypted form which provides a one-time pad level of data security by implementing selective nibble swaps of data bytes within a given encrypted data, recorded in a data map shared between the modules (a) to (e).

2. The system of the time series planning, evaluation and prediction of claim 1, wherein:

the at least one input interface element is implemented by way of at least one of: a user-selectable object, an input field, a slider, a drop-down menu; and the at least one output interface element is implemented by way of at least one of: a table, a list, an image, text, a statistical representation.

3. The system of the time series planning, evaluation and prediction of claim 1, wherein the interactive user interface enables the user to adjust an appearance of the at least one input interface element and/or the at least one output interface element.

4. The system of the time series planning, evaluation and prediction of claim 1, wherein the interactive user interface enables the user to adjust a relative arrangement of the at least one input interface element and/or the at least one output interface element.

5. The system of the time series planning, evaluation and prediction of claim 1, wherein the at least one output interface element further enables the time series planning, evaluation and prediction system to iteratively present (a) and (b) to the user, for the plurality of adjusted audit parameters.

6. The system of the time series planning, evaluation and prediction of claim 1, wherein the at least one output interface element enables the time series planning, evaluation and prediction system to present to the user, an influence of the at least one explanatory variable on the estimation of the response variable.

7. The system of the time series planning, evaluation and prediction of claim 1, wherein the at least one input interface element enables the user to input at least one forecasting variable, wherein the at least one forecasting variable is at least one of: an external variable, a time-dependent variable; and the at least one output interface element that enables the time series planning, evaluation and prediction system to present to the user:

a forecast time series chart representing a variation in a given variable with respect to time by way of a plurality of prior, current and forecasted data values of the given variable, wherein the forecast time series chart indicates an expected upper acceptance bound and an expected lower acceptance bound of data points in the forecast time series chart, the expected upper acceptance bound and the expected lower acceptance bound being identified based upon the plurality of audit parameters and the at least one forecasting variable; and unexpected data values from amongst the plurality of forecasted data values of the given variable, wherein the unexpected data values are identified as data points that fall outside the expected upper acceptance bound and the expected lower acceptance bound in the forecast time series chart.

8. The system of the time series planning, evaluation and prediction of claim 7, wherein the at least one output interface element enables the time series planning, evaluation and prediction system to present to the user, maximum achievable assurance level for the data values of the given variable over a given future time period, such maximum achievable assurance level being based upon an average prediction error for forecast data for variation in data values of the given variable over the given future time period.

9. The system of the time series planning, evaluation and prediction of claim 1, wherein the at least one output interface element enables the time series planning, evaluation and prediction system to present to the user, a comprehensive summary of the audit evidence, wherein the comprehensive summary indicates at least a status of the plurality of samples associated with the given use case, the status indicating whether or not a given sample is a key item pertaining to the audit evidence.

10. A method of operating a time series planning, evaluation and prediction system, the method comprising steps of:

generating, by at least one processing device, an interactive user interface to obtain audit evidence based upon input data pertaining to a given use case, the input data being in a time structured form, the method comprising:

(i) at least one input interface element configured to:

enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation, wherein the assurance level is provided by the user via an adjustment of a slider on the interactive user interface; and enable the user to adjust the plurality of audit parameters for the audit evidence; and (ii) at least one output interface element configured to enable the system to present to the user:

(a) a time series chart representing a variation in a response variable with respect to time, wherein the time series chart indicates an upper acceptance bound and a lower acceptance bound of data points in the time series chart, and wherein the time series chart is generated for a plurality of samples associated with the given use case based upon the input data, the plurality of audit parameters and at least one explanatory variable; and (b) key items, wherein the key items are identified as samples that fall outside the upper acceptance bound and the lower acceptance bound in the time series chart, wherein the interactive user interface dynamically updates the time series chart and acceptance bounds in real-time based on the user adjusted plurality of audit parameters for the audit evidence;

wherein the input data comprises data values of a set of variables for the plurality of samples associated with the given use case, and wherein:

the at least one input interface element enables the user to select a variable of interest from the set of variables; and the at least one output interface element enables the system to present to the user:

an impact of remaining variables of the set on the variable of interest, such impact being based upon relationships existing between the variables of the set; and inter-relations that exist between the remaining variables;

wherein the device is configured to calculate correlation coefficients between the variables of the set to determine the relationships existing therebetween; and wherein the device is configured to automatically select the time period for which the audit evidence is to be obtained by using an artificial intelligence algorithm;

wherein the system further comprises a server arrangement that includes a plurality of modules, wherein the modules include:

(c) a data input module configured to obtain the input data;

(d) a validation module configured to validate the input data based upon a predefined set of statistical rules;

(e) an interactive user interface module configured to provide the user with the interactive user interface;

(f) a data analysis module configured to generate the time series chart to be presented to the user via the interactive user interface and identify the upper acceptance bound and the lower acceptance bound of data points in the time series chart; and (g) an identification module configured to identify, from amongst the plurality of samples, the key items that are required to be tested;

wherein data exchange between the modules (a) to (e) is implemented in an encrypted form which provides a one-time pad level of data security by implementing selective nibble swaps of data bytes within a given data, recorded in a data map shared between the modules (a) to (e).

11. A software product comprising non-transitory machine-readable data storage mediums having stored thereon program instructions that when executed by at least one processing device, causes the at least one processing device to carry out the method of claim 10.

* * * * *